United States Patent [19]

Wank et al.

[11] 4,443,825

[45] Apr. 17, 1984

[54] MAGNETIC HEAD POLE PIECE MOUNT OF $TIO_2$-CAO

[75] Inventors: Larry A. Wank, Cornwallville; Joseph G. Braitling, Saugerties, both of N.Y.

[73] Assignee: North American Philips Corporation, New York, N.Y.

[21] Appl. No.: 335,914

[22] Filed: Dec. 30, 1981

[51] Int. Cl.³ .............................................. G11B 5/12
[52] U.S. Cl. .................................... 360/104; 360/110
[58] Field of Search ............... 335/278; 360/102, 103, 360/104, 110, 125, 122, 127, 128, 129

[56] References Cited

FOREIGN PATENT DOCUMENTS

P 3515  5/1953  Fed. Rep. of Germany .

Primary Examiner—George G. Stellar
Attorney, Agent, or Firm—Robert S. Smith

[57] ABSTRACT

A magnetic head has first and second pole pieces having a magnetic gap disposed therebetween. The pole pieces are mounted by a nonmagnetic material having a composition which, by weight, is between 10 and 30% calcium oxide and between 70 and 90% titanium dioxide and up to 2% zirconium dioxide.

3 Claims, 2 Drawing Figures

MAGNETIC HEAD POLE PIECE MOUNT OF TIO₂-CAO

This application is related to a copending U.S. patent application filed on the same day by the same inventors for a composition of matter and method of preparing that composition.

BACKGROUND OF THE INVENTION

The invention relates to magnetic heads and the construction thereof. More particularly, the invention relates to the slider or other non-magnetic structure which is commonly used to mount the pole pieces of a magnetic head which is used for data processing applications. The term slider will be understood to be a portion of a magnetic head which contacts the floppy disc surface while supporting the core or cores. Substantial progress has been made in improving magnetic and mechanical properties of magnetic heads. Many magnetic heads used in data processing applications are manufactured with glass bonded pole pieces in the manner described in Peloschek et al, U.S. Pat. No. 3,246,383. Although the present invention may advantageously be used with such heads, it will be understood that it also has application to other magnetic heads. Such other magnetic heads may be manufactured by sputtering or other techniques. A mechanical problem associated with the fabrication of magnetic heads is the maintenance of precise position relationship between the pole pieces of the magnetic head. The maintenance of the magnetic gap dimensions is of critical importance in either reading or writing data from or to a magnetic media.

The magnetic gap dimensions may change, for example, due to the effect of different coefficients of thermal expansion between the ferrite pole pieces and the structure which mounts the pole pieces. The structure used to mount the ferrite pole pieces, at least in structures intended for use with floppy disc drive assemblies, is typically identified as a slider.

It is an object of the invention to provide apparatus which will minimize differential expansion between a manganese-zinc (Mn-Zn) ferrite recording head and slider.

It is another object of the invention to provide the means by which the magnetic gap physical properties are manufactured and thus to facilitate maximum data density.

SUMMARY OF THE INVENTION

It has now been found that these and other objects of the invention may be attained in a magnetic head which includes first and second pole pieces having a magnetic gap disposed therebetween and means for mounting the pole pieces. The means for mounting includes a nonmagnetic material supporting the pole pieces which has a composition which, by weight, is between 10 and 30% calcium oxide and between 70 and 90% titanium dioxide and up to 2% zirconium dioxide.

In some forms of the invention the nonmagnetic material has a composition, by weight which is between 15 and 25% calcium oxide, between 75 and 85% titanium dioxide.

In other forms the nonmagnetic material is manufactured from an initial composition of approximately 19% calcium oxide and approximately 81% titanium dioxide and to that no more than 2% zirconium dioxide is added.

BRIEF DESCRIPTION OF THE DRAWINGS

The invention will be better understood by reference to the accompanying drawing in which.

DESCRIPTION OF THE PREFERRED EMBODIMENT

Figure 1:
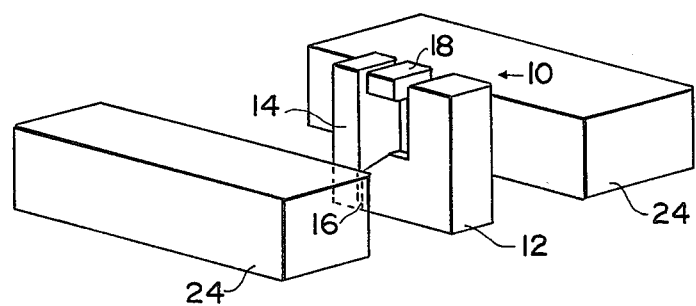
FIG. 1 is a partially schematic perspective view of the read and write core shown in exploded relationship with respect to the sliders of a typical magnetic head.
Figure 2:
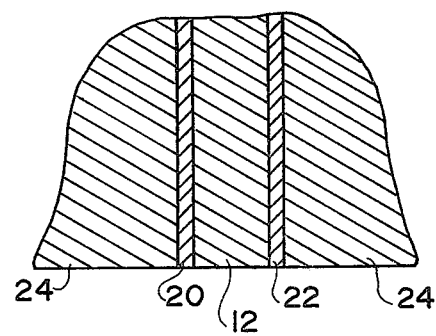
FIG. 2 is a sectional view of a portion of the sliders and pole pieces illustrated in FIG. 1 with the elements bonded together by glass bonding.

Referring now to FIGS. 1 and 2 there is shown a read and write core assembly 10 which includes pole pieces 12, 14 having a magnetic gap 16 disposed between them. The pole pieces 12, 14 are bonded together by glass bonding (not shown) which also bonds a back bar 18 intermediate the pole pieces 12, 14. The pole pieces 12, 14 are also bonded by glass bonding 20, 22 to a slider which will ordinarily substantially surround the core assembly 10 except for the lowermost (as viewed in FIG. 1) face thereof which has the magnetic gap 16 therein and which is positioned proximate to an associated magnetic media (not shown) in use.

It is the magnetic gap 16 which must be manufactured with precise dimensional characteristics and must not be distorted during the life of the apparatus. The pole pieces 12, 14 typically are manufactured of a manganese-zinc (Mn-Zn) material because this ferromagnetic alloy as been found to be superior to nickel-zinc magnetic recording heads for many applications. The desired material for the slider 24 or in other magnetic head constructions where the ferrite material is mounted on a nonmagnetic material must have a coefficient of expansion which is very close to that of the manganese-zinc ferrite. The nonmagnetic material must also lend itself to conventional manufacturing processes.

When the slider is manufactured of calcium oxide (CaO) and titanium dioxide ($TiO_2$) to which a small amount of zirconium dioxide ($ZrO_2$) has been added the desired mechanical properties for the slider and other similar nonmagnetic elements is achieved. More specifically, the material has substantially the same hardness as the ferrite material and also has a characteristic of substantially the same removal rate during lapping operations as the ferrite. Since it is customary to lap the entire core assembly 10 with the slider 24 it is desirable to have substantially the same removal rate so that the parts will maintain substantially a coplanar relationship after continued lapping.

The material for the slider is prepared in the preferred method by mixing calcium oxide and titanium dioxide in the respective weight percentages of 18.96% and 81.04%. These materials are then placed in a high alumina vessel and ground with zirconium balls. The grinding is continued until the particle size is substantially homogeneous and also so that the material is reactive enough so that a bar may be formed which is fully sintered. In some cases hot isostatic pressing may be utilized to optimize the mechanical properties of the slider or other nonmagnetic structure.

In various embodiments of the invention the initial quantity of calcium oxide may be between 10 and 30% and the initial quantity of titanium dioxide may be between 70 and 90% by weight. The percentage of zirconium dioxide in the final composition may be up to 2% by weight. It will be understood that this material is added to the mixture as a result of the grinding process and is removed from the balls which are used in the grinding or milling process. The percentage is by weight of calcium oxide and titanium dioxide, in the final mixture, will thus be approximately the same as the initial quantities.

What is claimed:
1. A magnetic head which comprises:
first and second pole pieces having a magnetic gap disposed therebetween and means for mounting said pole pieces which includes a nonmagnetic material supporting said pole pieces, said nonmagnetic material having a composition which, by weight, is between 10 and 30% calcium oxide and between 70 and 90% titanium dioxide and up to 2% zirconium dioxide.
2. The apparatus as described in claim 1 wherein said nonmagnetic material has a composition, by weight which is between 15 and 25% calcium oxide, between 75 and 85% titanium dioxide.
3. The apparatus as described in claim 2 wherein said nonmagnetic material is manufactured from an initial composition of approximately 19% clacium oxide and approximately 81% titanium dioxide and to that no more than 2% zirconium dioxide is added.

* * * * *